United States Patent [19]
Kubler et al.

[11] Patent Number: 5,419,223
[45] Date of Patent: May 30, 1995

[54] TURNING MACHINE FOR PRODUCING ECCENTRIC OR CONVEX GEOMETRIES ON CURRENT PARTS

[76] Inventors: Albert Kubler, Asternweg 17, 6900 Heidelberg; Martin Hoffman, deceased, late of Gertbergstr; by Gunda Hoffman, heiress, 6934 Neckargerach, Gertbergstr 5, all of Germany

[21] Appl. No.: 78,852

[22] Filed: Jun. 21, 1993

[30] Foreign Application Priority Data

Jul. 13, 1992 [DE] Germany ............... 42 22 967.7

[51] Int. Cl.⁶ ................................. B23B 5/18
[52] U.S. Cl. ..................... 82/118; 82/18; 82/138
[58] Field of Search .......... 82/18, 19, 12, 118, 82/122, 137, 138

[56] References Cited

U.S. PATENT DOCUMENTS

| | | | |
|---|---|---|---|
| 3,754,487 | 8/1973 | Nachtigal | 82/1.11 |
| 4,203,062 | 5/1980 | Bathen | 82/137 |
| 4,646,596 | 3/1987 | Edwards et al. | 82/19 |
| 4,679,472 | 7/1987 | Feller et al. | 82/19 |
| 5,181,442 | 1/1993 | Nezu | 82/118 |

Primary Examiner—William E. Terrell
Attorney, Agent, or Firm—Antonelli, Terry, Stout & Kraus

[57] ABSTRACT

A machining unit for the production of out-of-center/convex geometries on turned parts using an NC turning machine with at least one horizontal and one vertical machine axis comprises a highly-dynamic, controllable, integral three-phase servomotor having a shaft forming an additional tool axis, as a programmable direct drive for the production of out-of-center/convex geometries on current parts. The additional tool axis is capable of being NC controlled. The shaft has a connecting arm which carries one or more cutting tools for machining the parts. Spaced hydrostatic radial bearings and a hydrostatic axial bearing mount the shaft. A rotational measuring system measures rotation of the shaft. The shaft rotational measuring system, hydrostatic axial bearing and hydrostatic radial bearings as well as the servomotor are mounted in a common housing, with the connecting arm with cutting tools projecting from one side of the housing.

6 Claims, 6 Drawing Sheets

TURNING MACHINE FOR PRODUCING ECCENTRIC OR CONVEX GEOMETRIES ON CURRENT PARTS

FIELD OF INVENTION

The invention is a device for producing out-of-center/convex geometries on turned parts using an NC turning machine with at least one horizontal and one vertical machine axis and a tool arm for machining the workpiece.

The invention also includes a control system.

BACKGROUND

Because of the effects of heat on pistons of engines, particularly internal combustion engines, it is necessary to produce pistons which are convex and out-of-center with respect to their external skirt surface. This out-of-center has mainly in the past had a regular mathematical pattern. For example, the movement pattern produced for a stylus positioned against a piston skirt is a $sin^2x$-shaped movement for one rotation of the piston. Normally the amplitude of the out-of-center, but not its mathematical shape, changes corresponding to the height of the piston. The piston material is usually an aluminum alloy. Depending on the application, it is also normal to have an integral ring support cast into the piston in the ring area.

The surfaces of the piston skirt are normally machined on turning machines (lathes). The final machining of the piston skirt then takes place on a further machine whereby the out-of-center and convex shape is then formed. The depth of cut amounts to a few 1/10 mm. The cutting materials used in the aluminum range are PKD (polycrystalline diamond) and HM (hard metal) in the ring support area.

The machining of the surfaces of piston skirts is performed by NC machines with an additional mechanical copying attachment. In this case the cam rotates synchronously with the workpiece, with the cam geometry being transferred to the workpiece by a cutting tool secured to a tracer arm. The rotational speeds in this case are usually up to approximately 1500 o.p.m.

The most recent developments are concerned with trying to completely get rid of the cam and optimize the cutting speeds.

For example, the OKUMA Company has proposed a linear ancillary axis with a linear motor drive.

A similar proposal is known to have come from the ExCell-O Company.

The Cross Company has made a similar proposal, see U.S. Pat. No. 4,653,360.

Mahle GmbH has also proposed a linear ancillary axis driven by a moving coil, see German DE-PS 27 24 808.

The journal Werkstatt und Betrieb (123/1990), 5, p. 396–400 contains a description of how asymmetrical workpieces can be turned using a quick-response servo-system.

SUMMARY OF THE INVENTION

The invention is based on the task of designing a device going beyond the pre-specified type which enables high-precision out-of-center/convex geometries to be produced on turned parts of all kinds by means of an ancillary axis. The requirement is that more than one cutting medium should be held available and a changeover from cutting medium 1 to cutting medium 2 be performed as quickly as possible.

A further task of the invention is to propose a suitable control system for the aforesaid device.

The task is solved by the invention. The machining unit or ancillary device of the present invention is for the production of out-of-center/convex geometries on turned parts using an NC turning machine with at least one horizontal and one vertical axis. The machining unit comprises a highly-dynamic, controllable, integral three-phase servomotor motor having a shaft forming an additional tool axis, as a programmable direct rotational drive for the production of out-of-center-convex geometries on current parts. The additional tool axis is capable of NC controlled by an NC turning machine. The shaft has a connecting arm which carries one or more cutting tools for machining the work piece. Spaced hydrostatic radial bearings and a hydrostatic axial bearing are provided for mounting the shaft. A rotational measuring system measures rotation of the shaft. The shaft forming the additional axis, the rotational measuring system, the hydrostatic axial bearing and the hydrostatic radio bearings as well as the integral three-phase servomotor are mounted in a common housing, from one side of which the shaft with the connecting arm and cutting tools projects.

Thus, the device in accordance with the invention is a highly-dynamic, controllable additional tool axis with a programmable direct rotational drive for the production of out-of-center/convex geometries on turned parts of any kind. In this way pistons in particular can be machined out-of-center/convex on their outer skirt surface.

The high dynamics of the ancillary axis enables movement frequencies up to 100 Hertz. In this way, the rotational speed of the workpiece to be machined, e.g. piston, can be increased up to 3000 r.p.m. The increased rotational speed compared with traditional methods enable the cutting medium to be more economically used. The machining time of the workpieces is also reduced by the increased cutting speed and the quick tool change. The tool change is performed using the available NC machining axis.

In contrast to the traditional copying method, the cam is no longer required for the method described here. This means that in conjunction with the programmability of this ancillary device, the flexibility is substantially increased and the changeover time clearly reduced. Because the cam and the mechanical copying and transmission unit are no longer required, elements which are subject to wear and the danger of contamination are no longer needed.

This increases the process safety. Furthermore, dispensing with the mechanical copying and transmission unit increases the accessibility of the automatic tool loading device.

Designing the NC out-of-center machining unit without mechanical components subject to wear ensures high repeat accuracy over a long period.

The device in accordance with the invention is an "ancillary device" which can be adapted to any NC machine. The device has an NC-controlled axis. Because of the special requirement of this axis (controlled characteristics, accuracy, dynamics), the NC machine cannot undertake the control of the machining unit. Therefore, the invented device is provided with its own control system. This own control system is electrically controlled from a rapid signal processor board. The signal processor board uses three measuring systems to determine the absolute position of the cutting tool on the workpiece, e.g. on a piston. The next desired value of the position relative to the formed actual value is taken from a matrix stored on the board, on which the geometry data of the piston skirt to be machined has been entered, and is passed to the position controller on the board. The position controller forms a new current value for output to the drive amplifier.

According to a further feature of the disclosed invention, the integral three-phase motor, hydrostatic axial bearing and hydrostatic radial bearings of the machining unit are coaxially arranged in the common housing. The rotational measuring system with the hydrostatic mounting is mounted in two spaced hydrostatic radial bearings. A tool holder carries the cutting tools on the end of the connecting arm of the machining unit.

Further, the machine unit as referred to above is in combination with an NC turning machine wherein the machining unit is connected to the NC turning machine via an adaptor, such that a longitudinal axis of the connecting arm of the machining unit runs orthogonally to a longitudinal axis of a supporting tail stock spindle of the turning machine. The tailstock spindle supports the workpiece to be machined. The adaptor is connected to the machine tool by a horizontal slide which itself can slide horizontally on a vertical slide.

The connecting arm of the machining unit which carries one or more cutting tools preferably carries at least two cutting tools respectively arranged on opposite sides of the connecting arm. The connecting arm can be rotated about the additional tool axis of the machining unit to rotate the shaft with the connecting arm through any required angle enabling a change from one of the cutting tools to another cutting tool without the movement of other machine axes.

This control problem for the machining unit and NC lathe is solved by a control system of the invention. The control system controls the NC-controlled axis of the ancilliary device, the machining unit, by a signal processor board, which detects the absolute position of the cutting tool on the workpiece, e.g. on the piston, using three measuring systems and calls up the next desired position, relative to the formed actual value stored on the geometry data of the piston skirt or similar part to be machined and passes it to a position controller which constructs a new current level for the desired value and outputs it to a drive amplifier. The three-phase servomotor of the mahining unit generates a torque and a connecting arm with cutting tools is moved against the workpiece and the required surface of the piston skirt is produced by means of the cutting tools, whereby to enable a quick change of the cutting tools in contact with the workpiece, the connecting arm can be swiveled and the distance between the cutting tool and the workpiece can be changed.

The machining unit is mounted on the slide of an NC lathe. For machining, the horizontal machine axis of the machining unit moves to a predetermined dimension at the workpiece to be machined. The three-phase servomotor integrated into the machining unit generates a torque and holds or moves the cutting tool via the connecting arm. The rotary motion of the workpiece, the movement on the vertical machine axis and the N-C control movement of the cutting tool enable the required piston skirt surface to be produced.

For a quick change of the cutting tool in operation, the connecting arm is to be swivelled, or the predetermined dimension is to be changed. The arrangement of the cutting tool enables the workpiece machining to be continued in the same direction of rotation.

The drawings show an example of the machining unit and apparatus of the invention, in a part schematic arrangement.

DETAILED DESCRIPTION OF DISCLOSED EMBODIMENT

Figure 1:
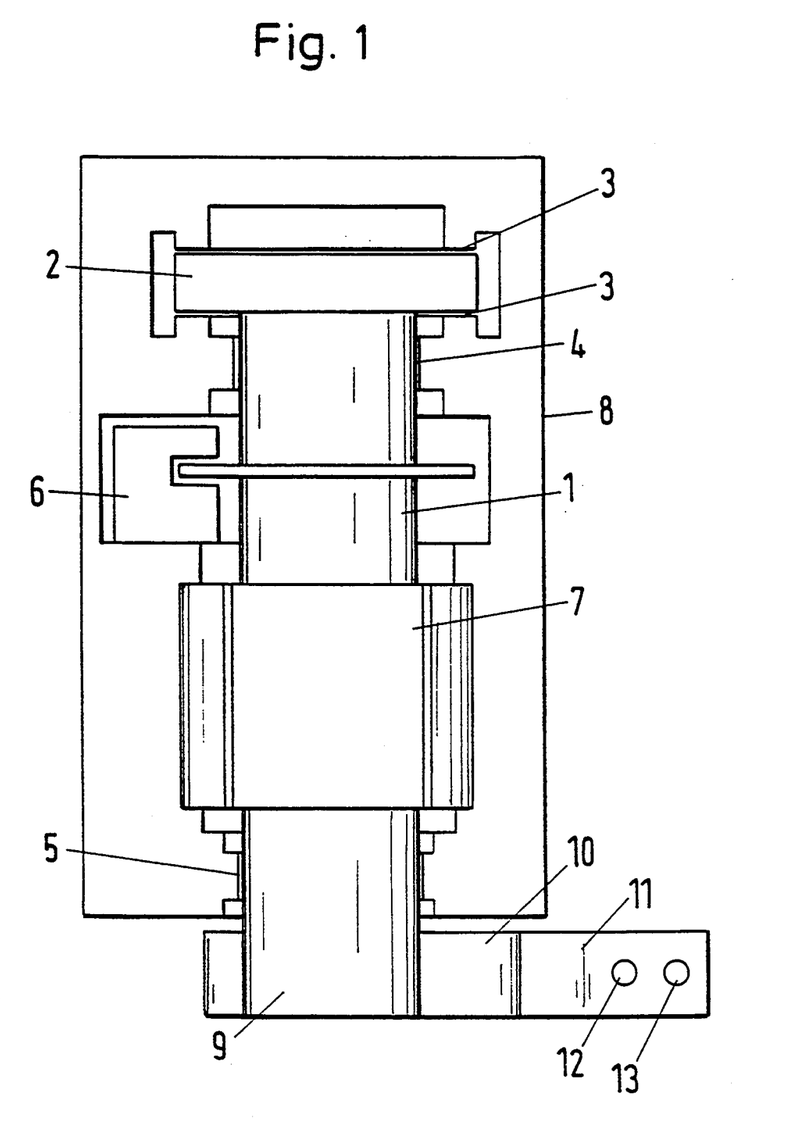
FIG. 1: A schematic representation of a machining unit in accordance with the invention.

Referring now to the drawings, particularly FIG. 1, (item 1) is a shaft with a collar (2) on one end which is supported by a hydrostatic axial bearing (3) and hydrostatic radial bearings (4) and (5) at a distance from the hydrostatic axial bearing (3) and from each other.

Item (6) is a rotational measuring system and (7) is a highly-dynamic, integrated three-phase servomotor. The shaft (1), its axial bearing (3) and radial bearings (4) and (5), the rotational measuring system (6) and the three-phase servomotor (7) are mounted in a common housing (8).

Figure 2:
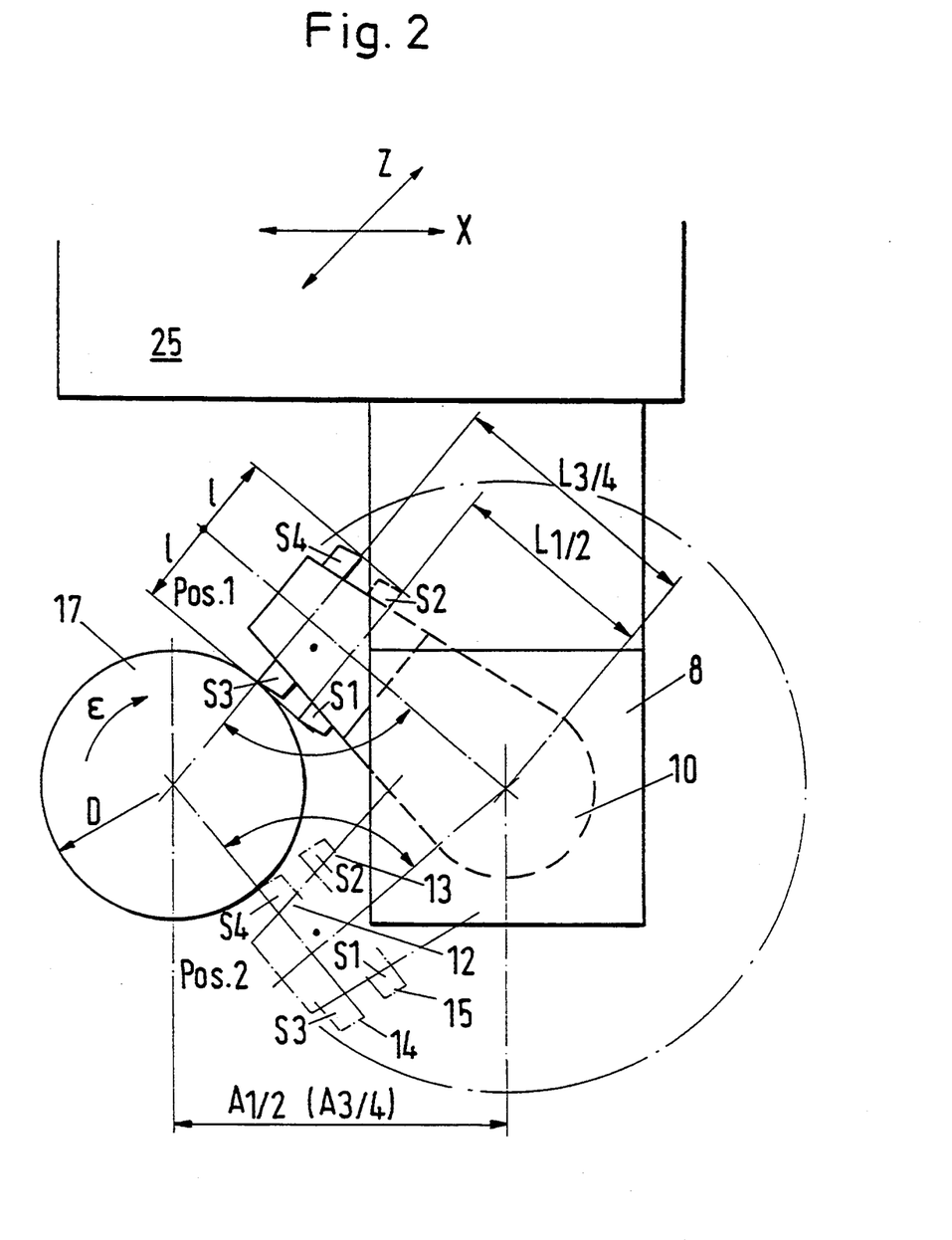
FIG. 2: A part front view of a machining unit in accordance with the invention.
Figure 3:
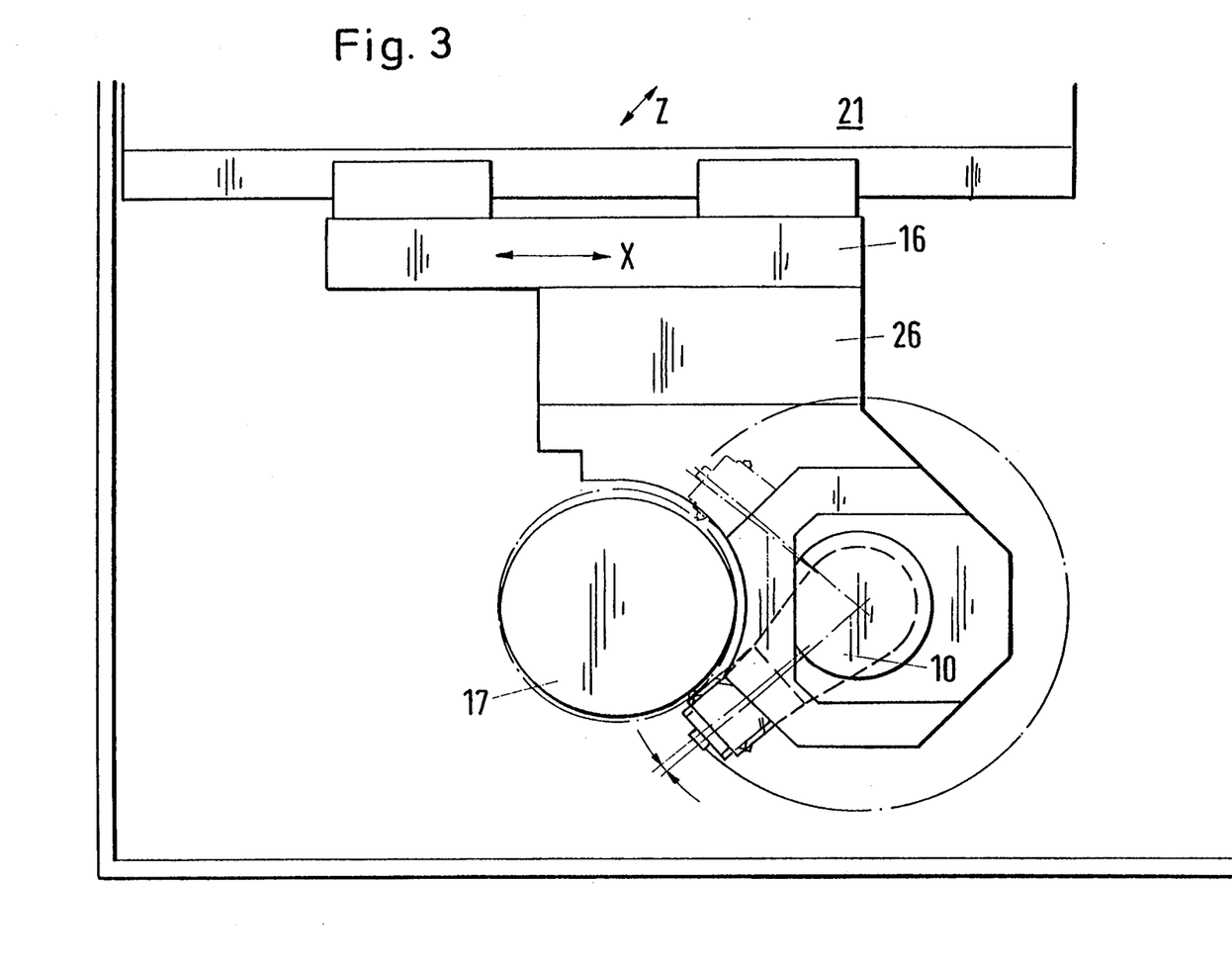
FIG. 3: A plan view with a machining unit in accordance with the invention mounted on an NC lathe.
Figure 4:
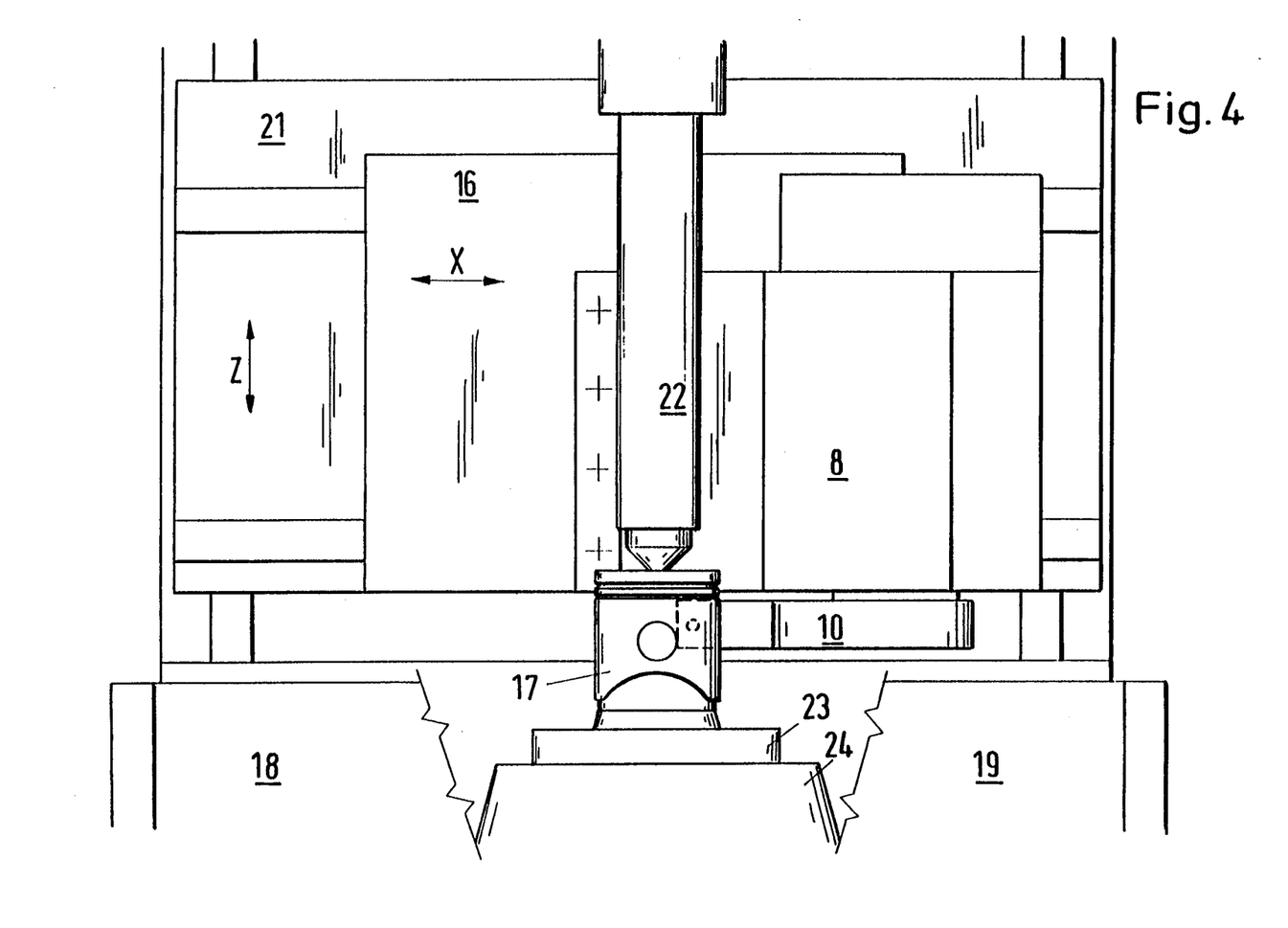
FIG. 4: A front elevation of FIG. 3.

The end section (9) of the shaft (1) opposite to the collar (2) projects by a limited amount from the common housing (8) and this part is fitted with a connecting arm (10) which has a tool carrier (11) which carries several changeable cutting tools, shown in FIG. 2 (12), (13), (14), and (15). The number of the cutting tools (12) to (15) can be greater or less than those shown.

Item (25) is a machine tool slide.

The horizontal machine axis is shown with X and the vertical machine axis with Z (FIG. 2).

The housing (8) and also the machining unit in accordance with the invention is secured via an adaptor plate (26) to a slide (16) of the machine tool by bolts or similar in a manner enabling it to be detached.

Item (17) is a workpiece to be machined, e.g. a piston, whilst (18) and (19) are swarf chutes, (16) is a horizontal slide and (21) a vertical slide. Item (22) is a supporting tailstock spindle and (23) is a workpiece holder with (24) being a main spindle.

The machining process using a machining unit in accordance with the invention is as follows:

The machining unit is fitted to the slide of an NC lathe. For machining, the horizontal machine axis x moves via the machining unit to dimension A (FIG. 2) at the workpiece (17). The three-phase servomotor (7) integrated into the machining unit generates a torque and holds or moves, via connecting arm (10), the cutting tools (12), (13), (14) and (15). The rotary motion of the workpiece (17), the movement of the vertical machine axis (Z) and the NC-controlled movement of cutting tools (12), (13), (14), and (15) enable the required piston skirt surface to be produced.

For a quick change of the cutting tools (12), (13), (14), and (15) in operation, the connecting arm (10) is swung from its top position shown in FIG. 2 with a solid line to its bottom position shown by a broken line, or dimension A is changed, e.g. A. ½ or A ¾. The arrangement of cutting tools (12), (13), and (14) enables the workpiece (17) to continue to be machined in the same direction of rotation.

Figure 5:
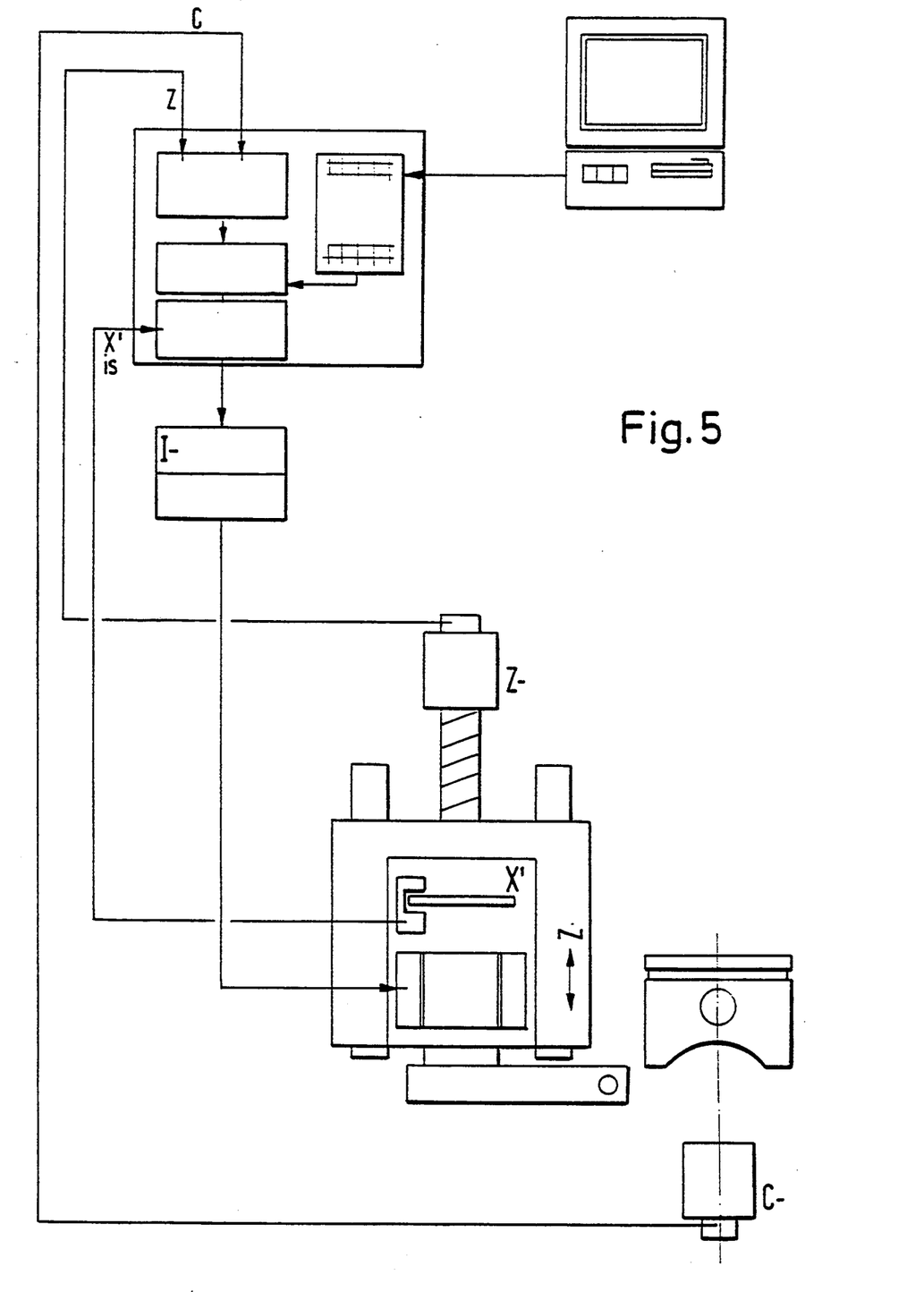
FIG. 5: A general drawing of the control system for a machining process with a machining unit in accordance with the invention.

FIG. 5 is a sketch showing the principle of the control system. The unit is electrically controlled from a quick signal processor board. By means of three measuring systems, the signal processor board detects the absolute position of cutting tools (12), (13), (14) and (15) on the workpiece (17). The next desired position relative to the formed actual value is taken from the matrix on the board, in which the geometry data of the workpiece to be machined e.g. a piston skirt has been entered and then output to the position controller on the board. The position controller forms a new desired value for the current level which is output to the drive amplifier.

The motor, mechanical assembly and measuring system, i.e. the mechanical construction in accordance with the invention are matched from the individual components of the drive system to the particular application, e.g. for piston turning.

Figure 6:
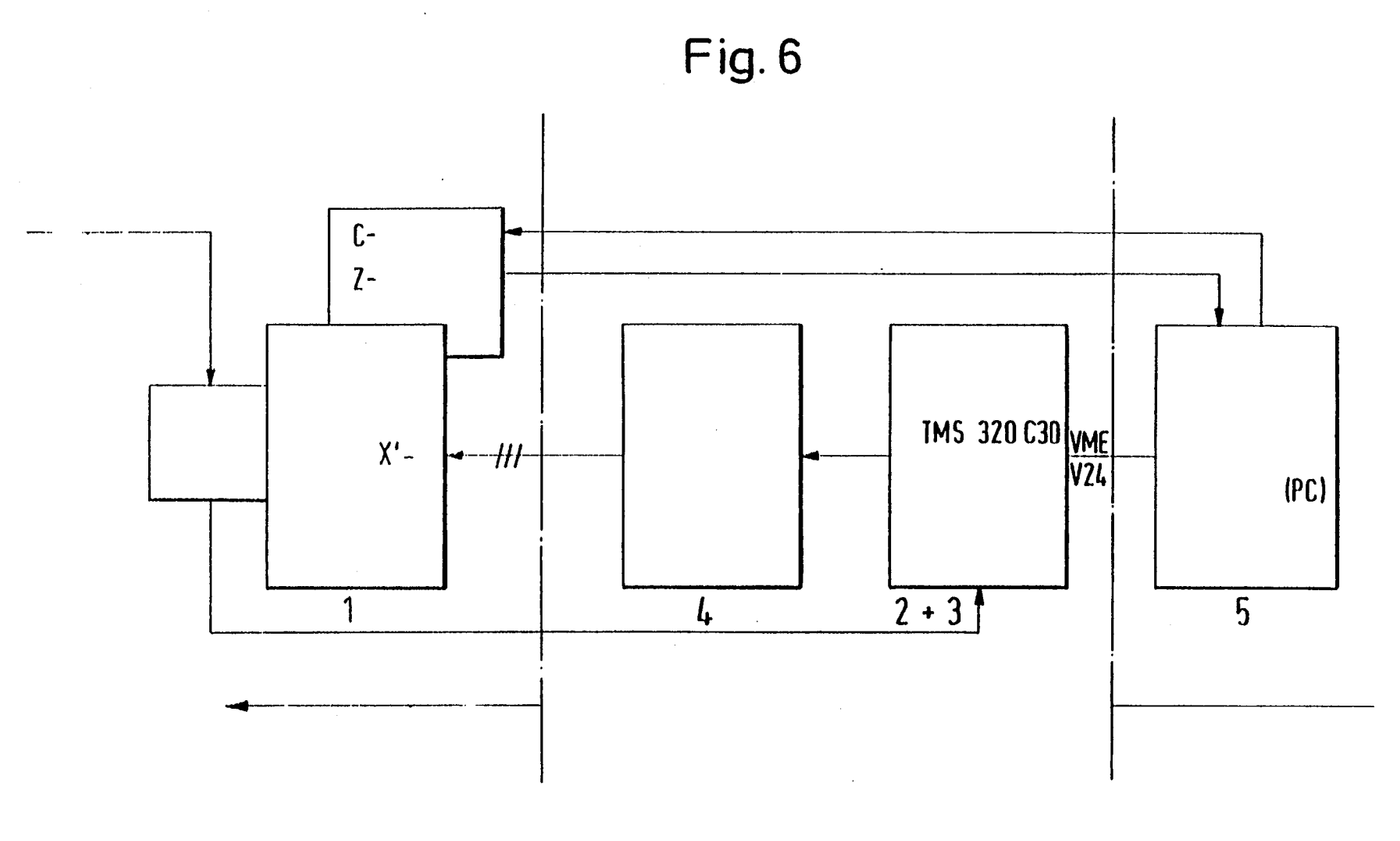
FIG. 6: A block diagram showing the arrangement of individual components.

As shown in FIG. 6, a rapid control processor based on a signal processor e.g. TMS 320 C 30 with an input-/output interface is integrated into the control system. The principles of a highly-dynamic drive of this kind are explained in the journal Technical Review 1991, No. 2 p. 40–44 "Complex and precise signal processors for control of highly-dynamic drives".

Control strategies for the control of highly-dynamic drives, the coupling of movement axes and the interfaces to invertors (current or instantaneous interface) and for superimposed control (VME 24) are generally known. Invertor (electrical positions) are also state of the art. The generation of the desired value depends on the particular application.

The features disclosed herein can be essential either individually or in any combination for the realization of the invention.

For clarity, the following keys to the illustrations in the drawings is presented.

1 Shaft
2 Collar
3 Axial bearing, hydrostatic
4 Radial bearing, hydrostatic
5 Radial bearing, hydrostatic
6 Measuring system, rotational
7 Three-phase servomotor, highly dynamic
8 Housing, common
9 End section
10 Connecting arm
11 Tool carrier
12 Cutting tool
13 Cutting tool
14 Cutting tool
16 Horizontal slide
17 Workpiece
18 Swarf shaft
19 Swarf shaft
20 —
21 Vertical slide
22 Supporting tailstock spindle
23 Workpiece support
24 Main spindle
25 Machine tool slide
26 Adaptor plate
A Dimension
X X-axis, horizontal
Z Z-axis, vertical
Key to items marked on FIG. 5 and 6

-continued

Key to FIG. 5
1 Actual
2 Actual
3 Signal processor board
4 Formation of actual value
5 Matrix for geometry
6 Calculation of actual value
7 Position controller
8 Actual
9 Act. controller
10 Power section
11 Drive controller
12 PC for determining geometry data
13 Z axis transmitter
14 Z axis
15 X axis transmitter
16 C axis transmitter Key to FIG. 6
1 User-specific part
2 Measuring system
3 Electric motor and X axis mechanics
4 C axis Z axis
5 Invertor
6 Control processor
7 Control unit with data qeneration
8 —
9 User-specific part It is claimed:

1. A machining unit for the production of out-of-center/convex geometries on turned parts using an NC turning machine with at least one horizontal and one vertical machine axis, said machining unit comprising:
(a) a highly-dynamic, controllable, integral three-phase servomotor having a shaft forming an additional tool axis, as a programmable direct drive for the production of out-of-center/convex geometries on current parts, said additional tool axis being capable of being NC controlled;
(b) said shaft having a connecting arm which carries one or more cutting tools for machining said parts;
(c) spaced hydrostatic radial bearings and a hydrostatic axial bearing on which said shaft is mounted;
(d) a rotational measuring system for measuring rotation of said shaft;
(e) a housing, said shaft forming the additional axis, said rotational measuring system, hydrostatic axial bearing and hydrostatic radial bearings as well as said integral three-phase servomotor being mounted in said housing, from one side of which said shaft with said connecting arm and cutting tools projects.

2. The machining unit according to claim 1, wherein said integrated three-phase motor, hydrostatic axial bearing and hydrostatic radial bearings are coaxially arranged in said housing.

3. The machining unit according to claim 1, wherein a tool holder carries said cutting tools on the end of said connecting arm.

4. The machining unit according to claim 1, in combination with an NC turning machine wherein said machining unit is connected to said NC turning machine via an adaptor, such that a longitudinal axis of said connecting arm runs orthogonally to a longitudinal axis of a supporting tail-stock spindle of said NC turning machine for said parts to be machined, and wherein said adaptor is connected to said NC turning machine by a horizontal slide, which itself can slide horizontally on a vertical slide.

5. The machining unit according to claim 1, wherein said one or more cutting tools includes at least two cutting tools respectively arranged on opposite sides of said connecting arm, a facility to rotate said shaft with said connecting arm through any required angle enabling a change from one of said cutting tools to another cutting tool without the movement of other machine axes.

6. A machining apparatus for the production of out-of-center/convex geometries on turned parts using an NC turning machine with at least one horizontal and one vertical machine axis, said apparatus comprising:

an NC turning machine with at least one horizontal and one vertical machine axis;

an ancillary device with an NC-controlled axis connected to said NC turning machine, said ancillary device including an integral three-phase servomotor which generates torque and a connecting arm which is rotatable about said NC-controlled axis thereof by said servomotor, said connecting arm having one or more cutting tools which can be moved against a workpiece for machining the workpiece; and means for controlling said NC-controlled axis of said ancillary device, said means for controlling including means for detecting an absolute position of a cutting tool on a workpiece, determining a next desired position of the cutting tool on the workpiece relative to the detected absolute position, and position controller means for effecting movement of said cutting tool to said next desired position.

* * * * *